Aug. 17, 1943.    M. McMAHON    2,327,055
AUTOMATIC SHUT-OFF VALVE
Filed Oct. 31, 1941    2 Sheets-Sheet 1

INVENTOR
MICHAEL McMAHON
By Hazard and Miller
ATTORNEYS.

Aug. 17, 1943.    M. McMAHON    2,327,055
AUTOMATIC SHUT-OFF VALVE
Filed Oct. 31, 1941    2 Sheets-Sheet 2

INVENTOR
MICHAEL McMAHON
By Hazard and Miller
ATTORNEYS.

Patented Aug. 17, 1943

2,327,055

UNITED STATES PATENT OFFICE 2,327,055

AUTOMATIC SHUTOFF VALVE

Michael McMahon, South Gate, Calif., assignor of one-half to Fred W. McRae, Los Angeles, Calif.

Application October 31, 1941, Serial No. 417,284

7 Claims. (Cl. 137—153)

This invention relates to an automatic shut-off valve for effecting an automatic shut-off upon pressures within a pipe line in which the valve may be inserted either exceeding or falling below a predetermined degree. It may be considered as an improvement over the disclosure made in my copending application Serial No. 381,484, filed March 3, 1941, now Patent No. 2,296,648, granted Sept. 22, 1942.

Heretofore, automatic shut-off valves have been provided consisting of a housing within which there is a check valve. The check valve is held in normally open position by a mechanism influenced by fluid pressure within the housing and the arrangement is such that the influenced mechanism may release the check valve to allow it to close when the pressure within the housing exceeds or falls below a predetermined degree. In the devices heretofore developed however the mechanism that releases the check valve has been invariably a single or a unitary mechanism which is objectionable in that it is difficult to adjust to take care of all situations. For example, if the normal pressure within the pipe line or conduit is forty pounds per square inch, the unitary mechanism may be adjusted to effect an automatic release and closure of the check valve if the pressure exceeds sixty pounds per square inch or falls below twenty pounds per square inch. It is usually fairly easy to adjust a single unitary mechanism to take care of equal amounts of excessive pressures and low or insufficient pressures. However, there are many situations where it is desirable to have the valve automatically close when the excessive pressures and insufficient pressures above and below normal, respectively, are unequal. For example, there are situations wherein with a normal pressure of forty pounds per square inch it is desirable to have the valve automatically close when the pressure exceeds forty-five pounds per square inch. At the same time it may not be objectionable to an extent that requires closing of the valve when the pressure falls down to twenty pounds per square inch. Conversely there are other situations wherein it is imperative to close the valve when the pressure falls from a normal pressure of forty-five pounds per square inch to thirty-five pounds per square inch, but it is not imperative to close the valve until the pressure exceeds sixty pounds per square inch. Where a single pressure influenced mechanism is used to effect an automatic shut-off it is very difficult, if possible at all, to so adjust the valve as to take care of such a variety of conditions.

A primary object of the present invention is to provide an automatic shut-off valve wherein two mechanisms are employed to effect a release and closure of the valve. One of these mechanisms serves to be effective when pressures fall below normal, and the other is effective to release the valve and allow it to close when pressures rise above normal. These mechanisms are independently adjustable whereby any of a large variety of circumstances or conditions can be taken care of.

With the foregoing and other objects in view, which will be made manifest in the following detailed description and specifically pointed out in the appended claims, reference is had to the accompanying drawings for an illustrative embodiment of the invention, wherein:

Figure 1:
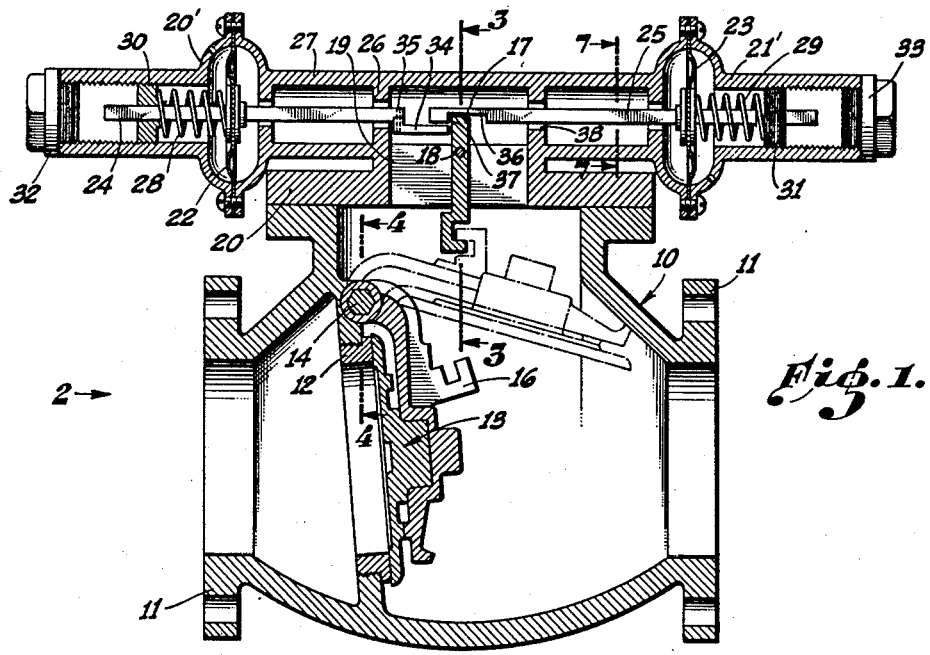
Figure 1 is a longitudinal vertical section through an automatic shut-off valve embodying the present invention in its preferred form.
Figure 2:
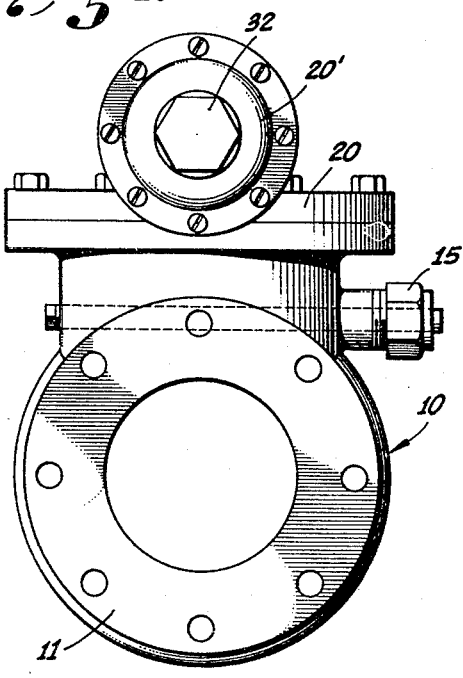
Fig. 2 is a view in end elevation of the same taken substantially in the direction of the arrow 2 upon Fig. 1.
Figure 3:
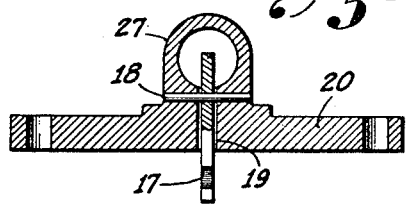
Fig. 3 is a partial view in vertical section taken substantially upon the line 3—3 upon Fig. 1 in the direction indicated.
Figure 4:
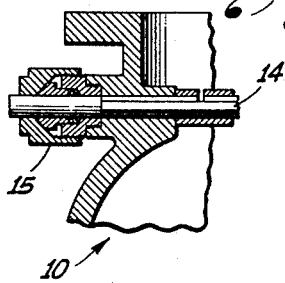
Fig. 4 is a partial view in vertical section taken substantially upon the line 4—4 upon Fig. 1.
Figure 5:
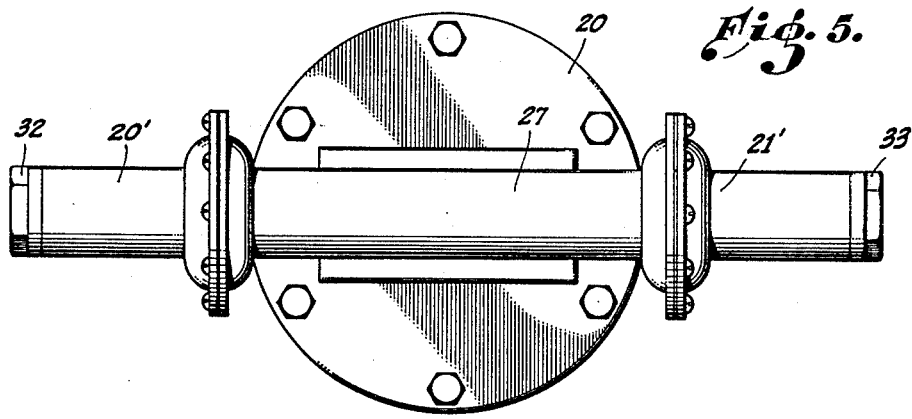
Fig. 5 is a top plan view of the valve illustrated in Fig. 1.

Referring to the accompanying drawings wherein similar reference characters designate similar parts throughout, the improved shut-off valve comprises a suitable valve housing 10 preferably equipped with apertured flanges 11 at its ends to permit of its being inserted in a pipe line or conduit, such as for example a gas main. Within the valve housing there is disposed a valve seat 12 for a check valve 13 which may be of any preferred design or construction. The check valve 13 is pivotally mounted within the housing on a transverse pintle 14 which is preferably hexagonally formed intermediate its ends. The ends of the pintle are preferably cylindrical and extend through stuffing boxes 15. On the check valve 13 there is a hooked detent 16 engageable by a latch 17 that is pivotally mounted on a transverse pin 18. This latch normally engages the detent 16 and holds the valve in open position as indicated in dotted lines on Fig. 1. The latch 17 is disposed in an opening 19 in the cover 20 of the housing. This cover has two opposed ends 20' and 21' within which are diaphragms 22 and 23. Rods 24 and 25 are secured to their respective diaphragms and slidably extend through webs or spiders 26 in the barrel 27 on the top of the cover. The outer ends of the rods 24 and 25 are surrounded by coil springs 28 and 29, the compression of which is adjustable by means of nuts 30 and 31 that are threaded into the ends of the barrel. The ends of the barrel are normally closed by caps 32 and 33. The inner end of rod 24 is equipped with a finger 34 that is attached to the rod 24 by means of a small screw or pin 35. The finger 34 is engageable with one side of the latch 17 above its pin 18. Rod 25 has its inner end notched as at 36 so as to provide a shoulder 37 that is engageable with the same side of the latch 17 as finger 34.

Figure 7:
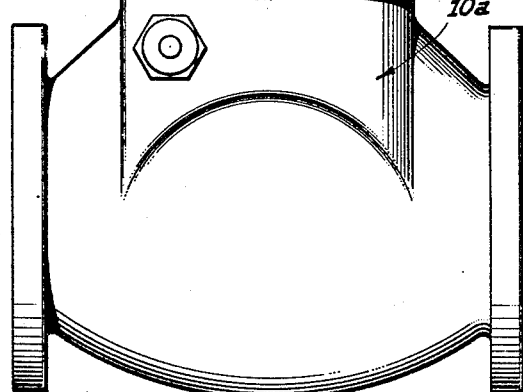
Fig. 7 is a sectional view taken substantially upon the line 7—7 upon Fig. 1 in the direction indicated.

As will be noted from an inspection of Fig. 7, the webs or partitions 26 have grooves or clearance spaces 38 around the rods 24 and 25 which are square. These clearance spaces serve to transmit pressure from the interior of the housing 10 to the interior of the barrel 27 and to the inner faces of the diaphragms 22 and 23.

The operation and advantages of the valve as above described are as follows. Normally the valve is held open or in the dotted line position illustrated in Fig. 1. Flow is normally taking place from the right-hand end of housing 10 toward the left. If the pressure within the housing 10 exceeds the normal pressure beyond a predetermined degree this pressure is effective on both diaphragms 22 and 23, forcing these diaphragms outwardly or toward the outer ends of the barrel. Rod 24 during such outward movement merely pulls the finger 34 away from the latch 17 without having any effect thereon. Outward movement of the rod however causes the shoulder 37 to engage the latch 17 and to swing the latch a sufficient distance to cause it to disengage the detent 16, allowing the check valve to close thus automatically shutting off the line in the event of an abnormally high pressure.

Conversely, if the pressure within housing 10 falls below a predetermined degree, the pressure on the inner faces of the diaphragms 22 and 23 is reduced and the springs 28 and 29 force the rods 24 and 25 inwardly. Inward movement of the rod 25 has no effect upon the latch 17 as the shoulder 37 merely moves a short distance away from the latch. Inward movement of the rod 24 however pushes finger 34 against the latch, causing it to release the check valve and allow it to close. Thus the valve will automatically close when the pressure within the housing falls below a predetermined degree.

As each mechanism is independent of the other, it is manifest that the adjustment of the nuts 30 and 31 is utterly independent of each other. For example, nut 30 can be adjusted to trip the latch 17 whenever the pressure in the housing 10 is only five pounds below normal. At the same time, nut 31 can be adjusted so that the check valve will not be released until the internal pressure in the housing exceeds twenty pounds above normal. Vice versa, nut 31 can be adjusted to trip latch 17 when the pressure in the housing is only five pounds above normal and at the same time, nut 30 can be adjusted to trip the latch only when the pressure within the housing is less than twenty pounds below normal. The nuts can be adjusted to trip the latch and allow the valve to automatically close under virtually any desired set of conditions. Thus, if it is desired to have the valve automatically close when the pressure within housing 10 is only two pounds above normal or two pounds below normal, the nuts may be adjusted accordingly. If it is desired on the other hand to permit of a variation in pressure in the housing, a great deal below normal but only slightly above normal, the nuts may be adjusted accordingly. Likewise, if it is desired to have the valve automatically close and the pressure is but a little below normal but a great deal above normal, this set of conditions is also taken care of by the valve due to the fact that the high pressure operating mechanism and the low pressure operating mechanism are independent of each other and are independently adjustable.

Figure 6:
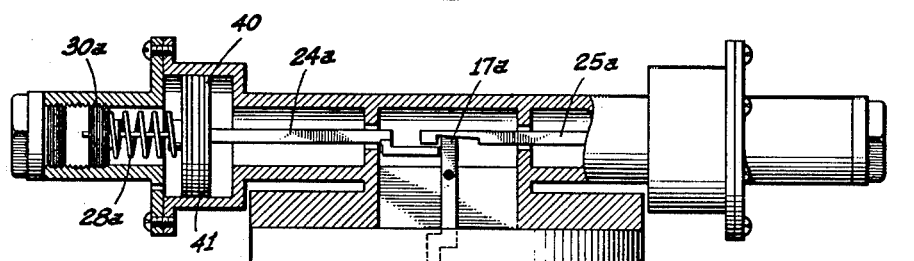
Fig. 6 is a view in side elevation of a valve, parts being broken away and shown in section illustrating a slightly modified form of construction embodying the present invention.

In Fig. 6 a slightly modified form of construction is illustrated wherein the latch is indicated at 17a. The rods are indicated at 24a and 25a, respectively. These rods are connected to pistons 40 operating in cylinders 41 on the ends of the barrel. The springs 28a are compressed between the pistons and adjacent nuts indicated at 30a.

The operation of this form of construction is substantially the same as that above described. The fluid pressure within the housing 10a is transmitted to the inner faces of the pistons. When the pressure exceeds normal the pistons are forced outwardly against compression of their respective springs. When the pressure within the housing falls below normal, the springs force the pistons and their rods 24a and 25a inwardly. The nuts can be adjusted to take care of any variety of conditions as above described. This form of construction is advantageously employed where the fluid passing through the valve is in the form of a liquid which may not be used with diaphragms. This form of construction may, if desired, be used where the pipe line or conduit is conveying gas although in the majority of instances the diaphragm type of construction illustrated in Fig. 1 is more suitable in the case of gas.

It will be noted that in all forms of construction disclosed herein that once that the check valve is released either by high or low pressure that it remains closed and requires a manual resetting of the valve, this being accomplished by manually lifting the valve into its open position. In other words, once that the valve is tripped a return of pressure to normal will not automatically reopen the valve but a positive and conscious effort is required in order to reopen the valve. This is highly advantageous under certain circumstances where an abnormal change of pressure creates such conditions that appropriate precautionary steps must be taken prior to reestablishing normal flow through the pipe line or conduit.

From the above-described construction it will be appreciated that the improved automatic shut-off valve is much more flexible in its adjustment, capable of being set to allow an automatic closing upon the pressures in the housings exceeding or falling below any set maximum and minimum. The maximum and minimum may be equally above and below normal if desired.

Various changes may be made in the details of construction without departing from the spirit or scope of the invention as defined by the appended claims.

I claim:

1. An automatic shut-off valve for high and low pressure release comprising a housing, a check valve in the housing, a latch pivoted within the housing normally holding the check valve open, two diaphragms mounted on the housing on opposite sides of the latch, push rods associated with the diaphragms engageable with the same side of the latch, said diaphragms having their inner faces exposed to pressure within the housing, springs arranged on the outer sides of the diaphragms for urging the diaphragms inwardly, and means for adjusting the compression of each spring whereby when the pressure within the housing exceeds or falls below a predetermined maximum or minimum the latch will automatically effect a release of the valve.

2. An automatic shut-off valve for high and low pressure release comprising a housing, a check valve in the housing, a latch pivotally mounted within the housing normally holding the check valve open, rods arranged on opposite sides of the latch but having portions engageable with the same side of the latch, pistons on the rods, said pistons having their inner faces exposed to pressure within the housing, springs on the outer sides of the piston urging the pistons inwardly, and means for independently adjusting the compression of each spring whereby when the pressure within the housing exceeds or falls below a predetermined maximum or minimum the latch will automatically release and allow the check valve to close.

3. An automatic shut-off for high and low pressure release comprising a body having a passage for fluid flow therethrough, a valve seat therein, a check valve hingedly mounted in the body urged to seat upon said seat, a latch disposed within said body engageable with the check valve for holding the check valve open, a pair of diaphragms disposed within said body and exposed to the pressure of fluid that may be therein, means operable by one diaphragm to cause the latch to release the valve when pressure in the body is abnormally high, and means operable by the other diaphragm to cause the latch to release the valve when pressure in the body is abnormally low.

4. An automatic shut-off for high and low pressure release comprising a body having a passage for fluid flow therethrough, a valve seat therein, a check valve hingedly mounted in the body urged to seat upon said seat, a latch pivotally mounted in the body above the check valve engageable with the check valve for holding the check valve open, said body providing diaphragm housings on opposite sides of the latch, diaphragms in the diaphragm housings subject to pressure of fluid in the body, a rod operable by one diaphragm to engage with one side of the latch when pressure in the body is abnormally high to cause the latch to release the valve and another rod operable by the other diaphragm to engage the same side of the latch when the pressure in the body is abnormally low to cause the latch to release the valve and allow the valve to close.

5. An automatic shut-off for high and low pressure release comprising a body having a passage for fluid flow therethrough, a valve seat therein, a check valve hingedly mounted in the body urged to seat upon said seat, a latch pivotally mounted in the body above the check valve engageable with the check valve for holding the check valve open, said body providing diaphragm housings on opposite sides of the latch, diaphragms in the diaphragm housings subject to pressure of fluid in the body, a rod operable by one diaphragm to engage with one side of the latch when pressure in the body is abnormally high to cause the latch to release the valve and another rod operable by the other diaphragm to engage the same side of the latch when the pressure in the body is abnormally low to cause the latch to release the valve and allow the valve to close, the outer sides of the diaphragm housings being openable, springs disposed in the diaphragm housings operable upon the diaphragms, and means adjustable through the openable sides of the diaphragm housings to adjust the compressions of the springs.

6. An automatic shut-off for high and low pressure release comprising a body having a passage for fluid flow therethrough, a valve seat therein, a check valve hingedly mounted in the body urged to seat upon said seat, a latch disposed within said body engageable with the check valve for holding the check valve open, a pair of pressure-responsive means mounted on the body on opposite sides of the latch adapted to be influenced by the pressure within the body, a rod operable by one pressure-responsive means to engage with one side of the latch when pressure in the body is abnormally high to cause the latch to release the valve, and another rod operable by the other pressure-responsive means to engage the same side of the latch when the pressure in the body is abnormally low to cause the latch to release the valve and allow the valve to close.

7. An automatic shut-off for high and low pressure release comprising a body having a passage for fluid flow therethrough, a valve seat therein, a check valve hingedly mounted in the body urged to seat upon said seat, a latch disposed within said body engageable with the check valve for holding the check valve open, a pair of pressure-responsive means mounted on the body on opposite sides of the latch adapted to be influenced by the pressure within the body, a rod operable by one pressure-responsive means to engage with one side of the latch when pressure in the body is abnormally high to cause the latch to release the valve, and another rod operable by the other pressure-responsive means to engage the same side of the latch when the pressure in the body is abnormally low to cause the latch to release the valve and allow the valve to close, and spring means arranged on the outsides of each pressure-responsive means and independently adjustable for varying the pressures at which the pressure-responsive means become operable upon the latch.

MICHAEL McMAHON.